United States Patent [19]

Dannels et al.

[11] 4,370,123

[45] Jan. 25, 1983

[54] APPARATUS FOR RUNNERLESS INJECTION COMPRESSION MOLDING OF THERMOSETTING MATERIALS

[75] Inventors: W. Andrew Dannels, Grand Island, N.Y.; Robert W. Bainbridge, Gainesville, Ga.

[73] Assignee: Occidental Chemical Corporation, Niagara Falls, N.Y.

[21] Appl. No.: 278,238

[22] Filed: Jun. 29, 1981

Related U.S. Application Data

[63] Continuation-in-part of Ser. No. 118,381, Feb. 5, 1980, Pat. No. 4,290,744, which is a continuation-in-part of Ser. No. 972,182, Dec. 21, 1978, abandoned, and Ser. No. 164,412, Jun. 30, 1980, Pat. No. 4,309,379, which is a continuation-in-part of Ser. No. 972,189, Dec. 21, 1978, Pat. No. 4,238,181.

[51] Int. Cl.$^3$ .............................................. B29G 3/00
[52] U.S. Cl. .................................. 425/543; 264/328.2; 264/328.7; 425/548; 425/549; 425/575; 425/590
[58] Field of Search ............... 425/543, 544, 548, 549, 425/574, 575, 589, 590; 264/328.7, 328.2

[56] References Cited

U.S. PATENT DOCUMENTS

| 3,787,159 | 1/1974 | Bielfeldt | 425/543 |
| 3,797,984 | 3/1974 | Yago | 425/543 |
| 3,819,312 | 6/1974 | Arpajian | 425/543 |
| 4,012,386 | 3/1977 | Davis | 264/328.7 |
| 4,017,242 | 4/1977 | Mercer | 425/543 |
| 4,091,057 | 5/1978 | Weber | 264/328.7 X |

FOREIGN PATENT DOCUMENTS 46-18627  5/1971  Japan ................................. 425/564

Primary Examiner—Thomas P. Pavelko
Attorney, Agent, or Firm—James F. Tao; James F. Mudd; William G. Gosz

[57] ABSTRACT

The apparatus of the present invention includes a stationary assembly and a movable assembly. The stationary assembly is comprised of a stationary platen which has a heat plate, a temperature-controlled sprue bushing and a mold face positioned thereon. The movable assembly is comprised of a movable platen which has a heat plate mounted thereon and a mold face, corresponding to, and adapted to be aligned with, the mold face on the stationary assembly to form a partially open mold cavity. Means are provided to feed a supply of thermosetting molding material through the sprue bushing into the partially open mold cavity. Means are provided to completely close the mold cavity and place the apparatus in a compression stage. In the injection and in the compression stages, the discharge end of the sprue bushing is in direct feed relationship with the mold cavity, allowing flow of molding material from the sprue bushing into the mold cavity in the injection stage and flow of molding material from the mold cavity into the sprue bushing in the compression stage. Means are also provided for the subsequent retraction of the movable assembly to allow removal of a molded article and access to the mold area.

5 Claims, 3 Drawing Figures

APPARATUS FOR RUNNERLESS INJECTION COMPRESSION MOLDING OF THERMOSETTING MATERIALS

RELATED APPLICATIONS

The present application is a continuation-in-part of U.S. Ser. No. 118,381, filed Feb. 5, 1980, now U.S. Pat. No. 4,290,744 in turn a continuation-in-part of U.S. Ser. No. 972,182, filed Dec. 21, 1978, now abandoned both entitled. "Apparatus for Runnerless Injection-Compression Molding Thermosetting Materials", and of U.S. Ser. No. 164,412, filed June 30, 1980, now U.S. Pat. No. 4,309,379, in turn a continuation-in-part of U.S. Ser. No. 972,189, filed Dec. 21, 1978, now U.S. Pat. No. 4,238,181, both entitled, "Method and Apparatus for Runnerless-Compression Molding Thermosetting Materials".

BACKGROUND OF THE INVENTION

The present invention relates to an apparatus for molding thermosetting materials and, more particularly, to the molding of thermosetting synthetic resin compositions.

Injection molding is an advantageous method of forming articles of synthetic resin. In general terms, injection molding is a process wherein the molding composition, in a melted or plasticized state, is injected into a mold cavity. Typically, molding composition in granular form is fed from a hopper into a heated cylinder containing a screw, or ram. The molding composition is heated, melted and plasticized in the heated cylinder area, and then the screw, or ram, injects the melted and plasticized material into a mold cavity. In the case of thermosetting material, the molded material is cured in the mold by compaction and by heat added to the mold cavity. After curing, the article is ejected from the mold and the process repeated Injection molding offers the advantage of reduced molding cycles, better control of process variables and increased productivity as compared with conventional compression and transfer molding processes. The major disadvantage with the injection molding of thermosetting materials is the generation of a considerable amount of waste material. The waste material is generated by thermosetting material that has cured, become infusible, in the runner and sprue system and cannot be reused. The amount of non-reusable waste material generated in this fashion in single cavity molding can be substantial, ranging typically from about 2 to about 15 percent of the total amount of material required to mold an article.

A more recent technical advance in the molding art has been the adaptation of the runnerless injection, or cold manifold, process to the injection molding of thermosetting resins. In the cold manifold process, the material in the sprue and manifold system is maintained at a temperature sufficient to maintain the material in a plasticized condition, without causing the material to prematurely cure, or "set-up". Thus, when a cured part is removed from the mold cavity, the material in the sprue and manifold becomes part of the next molding, instead of being discarded as in conventional injection molding operations. The runnerless injection process, therefore, provides for significant savings in material.

The thermosetting materials usually employed in runnerless injection processes differ in some respects from materials normally employed in conventional injection processes because of the different requirements of each process. One significant difference is that a standard injection molding material typically has a stiffer plasticity. In contrast, a runnerless injection material is adapted to remain in a plasticized, or fused, condition in the feed system for extended periods of time without prematurely curing, usually at temperatures between about 104° and 116° C. (220° to 240° F.), while also being capable of rapidly curing in the mold cavity at the molding temperature, usually about 170° C. (340° F.). Examples of suitable runnerless injection molding compositions are described in U.S. Pat. Nos. 4,210,732; 4,239,869; and 4,241,201, all entitled, "Phenolic Resins With Improved Low Temperature Processing Stability". The disclosures in the foregoing patents are hereby incorporated by reference. Although such formulations are useful in the present apparatus, they are not required, and the molding compositions presently utilized may be selected from the more economical and more readily available standard thermosetting molding compositions.

Thermosetting molding materials useful in the present invention may suitably be selected from thermosetting synthetic resins and resin compositions typically used in molding operations; for example, phenolic; amino, such as urea, melamine and melamine/phenolic; polyester resins in granular, nodular, bulk or sheet forms; alkyd; epoxy; silicone; diallylphthalate; polyamides; or from thermosetting natural and synthetic rubber compositions. Phenolic resin compositions are especially useful as the feed material. Phenolic resin compositions used in molding operations are usually employed in the form of molding compositions. Phenolic molding compositions typically are particulate in form, containing a molding grade phenolic resin, a cross-linking agent, such as hexamethylenetetramine, and suitable filler materials.

The technique of injection-compression molding basically consists of injecting a charge of plasticized molding material into a partially open mold; the final fill, or mold fit, is accomplished by the subsequent complete closure of the mold. Injection-compression molding makes possible a combination of the positive attributes of compression molding, i.e., improved dimensional stability, uniform density, low shrinkage and high impact strength with the advantages of automation and fast cure of injection molding.

The present invention provides an improved apparatus for adapting the advantages of injection-compression molding to include the advantages of runnerless injection techniques and facilitates the use of standard phenolic molding compositions in such apparatus. The present apparatus allows the use of commercially available, standard nozzles in runnerless injection-compression molding processes. Heretofore, adaptations were required in the nozzle and distribution system to obtain the foregoing advantages.

GENERAL DESCRIPTION OF THE INVENTION

The present invention provides an improved molding apparatus for injection-compression molding of thermosetting molding materials. The apparatus comprises a stationary platen assembly and a movable platen assembly.

The stationary assembly is comprised of a stationary platen member, or support plate, a heated plate mounted on the support plate and a mold face mounted on the heat plate. The stationary assembly has a cooled sprue bushing positioned therein and extending therethrough. The sprue member has a receiving end adapted to engage, usually by contact, with the nozzle member of an injection molding machine. The sprue bushing has a discharge end adapted to feed thermosetting molding material directly into the mold cavity. The temperature maintained in the sprue bushing is sufficiently high to maintain the thermosetting molding material within the sprue bushing in a plasticized state and sufficiently low that no substantial curing, or setting-up, of the thermosetting molding material takes place. By substantial curing or setting-up of the thermosetting molding material is meant the amount of premature polymerization which would adversely inhibit the plasticity or mobility of the molding material.

The movable assembly is comprised of a movable platen member, or support plate, a heated plate mounted thereon and a mold face mounted on the heat plate, corresponding to and adapted to be aligned with, the mold face on the stationary assembly to form a mold cavity.

In the injection, or feed, stage the movable assembly is positioned to bring the mold face on the movable assembly into close proximity with the corresponding and aligned mold face on the stationary assembly to form a partially open mold cavity. Thermosetting molding material in a plasticized state is then fed through the nozzle member, through the cooled sprue bushing, directly into the partially open, heated mold cavity. In the injection stage and in the subsequent compression stage, the discharge end of the sprue bushing is in direct feed relationship with the mold cavity, allowing flow of molding material from the sprue bushing into the mold cavity in the injection stage and flow of molding material from the mold cavity into the sprue bushing in the compression stage.

In the compression stage, the heated mold cavity is closed completely by further movement, suitably by hydraulic and/or mechanical means, of the movable assembly in a direction toward the stationary assembly. This movement disrupts further feed of thermosetting material by a pressure generated in the molding material in the mold which, in turn, creates a back-pressure at, and a back-flow through, the discharge end of the sprue member. This, much of the molding material which would normally be lost in the sprue, and flash as waste is salvaged by back-flow of the material into the cooled sprue bushing, making the material available for the next shot, or filling, upon closing of the mold faces, the thermosetting material within the confines of the mold cavity is pressed and heated to a temperature sufficiently high to cure the material.

After curing, the movable assembly is retracted, moved away from, the stationary assembly, suitably by hydraulic and/or mechanical means, to remove the molded article and provide access to the mold face and surrounding area. The thermosetting material remaining in the nozzle and sprue is maintained in a plasticized, substantially uncured state, ready for the next shot or filling.

DETAILED DESCRIPTION OF THE INVENTION

The present invention will be illustrated and more fully described by reference to the accompanying drawings.

Figure 1:
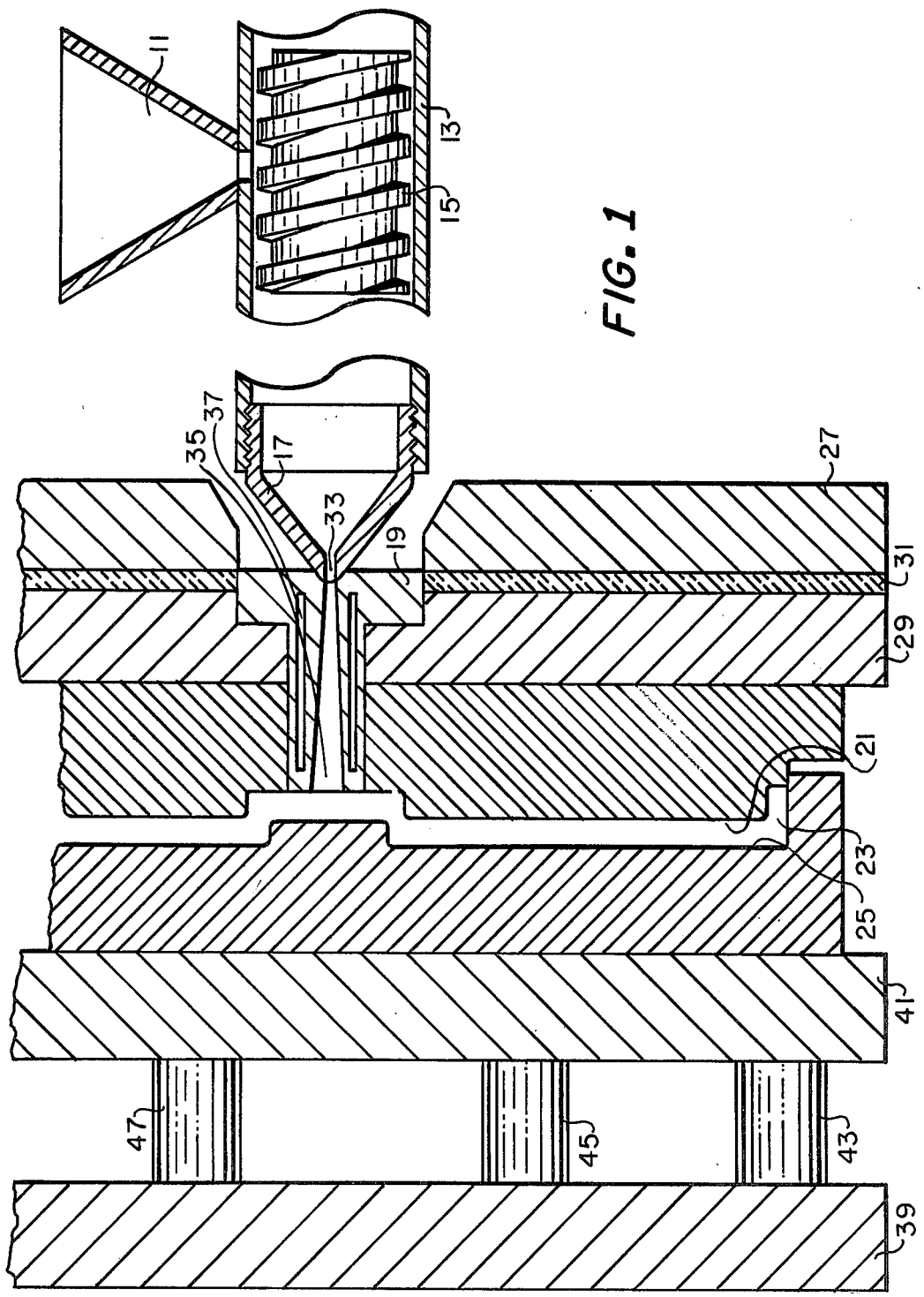

FIG. 1 is a cross-sectional, partly schematic view of an apparatus of the present invention. The apparatus shown in a portion of an injection molding machine having a horizontal clamping arrangement. As shown in FIG. 1, the apparatus is in the injection, or feed, stage of the molding cycle. In this stage, thermosetting molding material is fed into a partially open mold.

Figure 2:
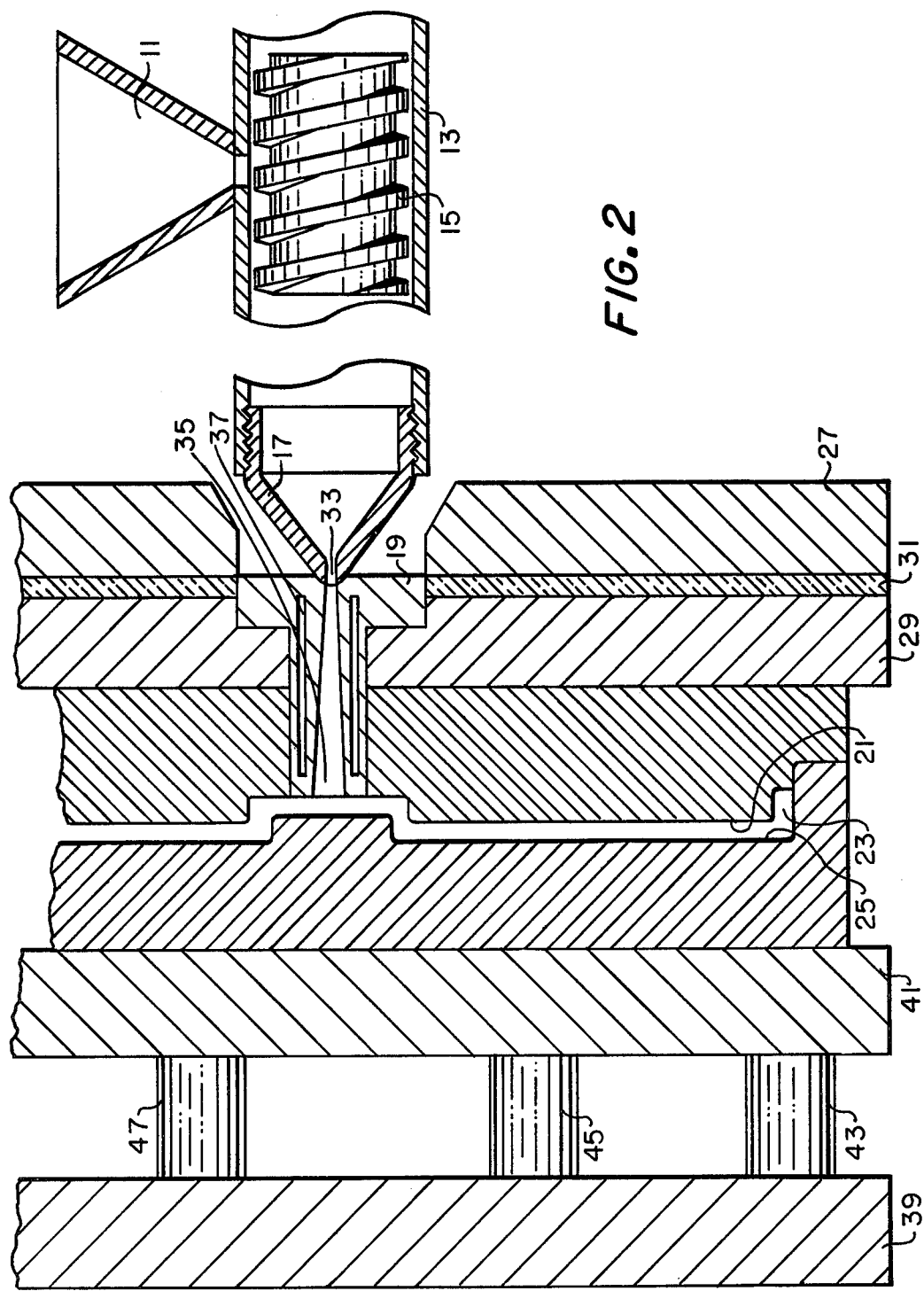

FIG. 2 shows the apparatus of FIG. 1 in the compression stage. In this stage, the mold is completely closed. The thermosetting material within the confines of the closed mold during this stage is pressed and heated to cure the enclosed material to the shape of the mold cavity.

Figure 3:
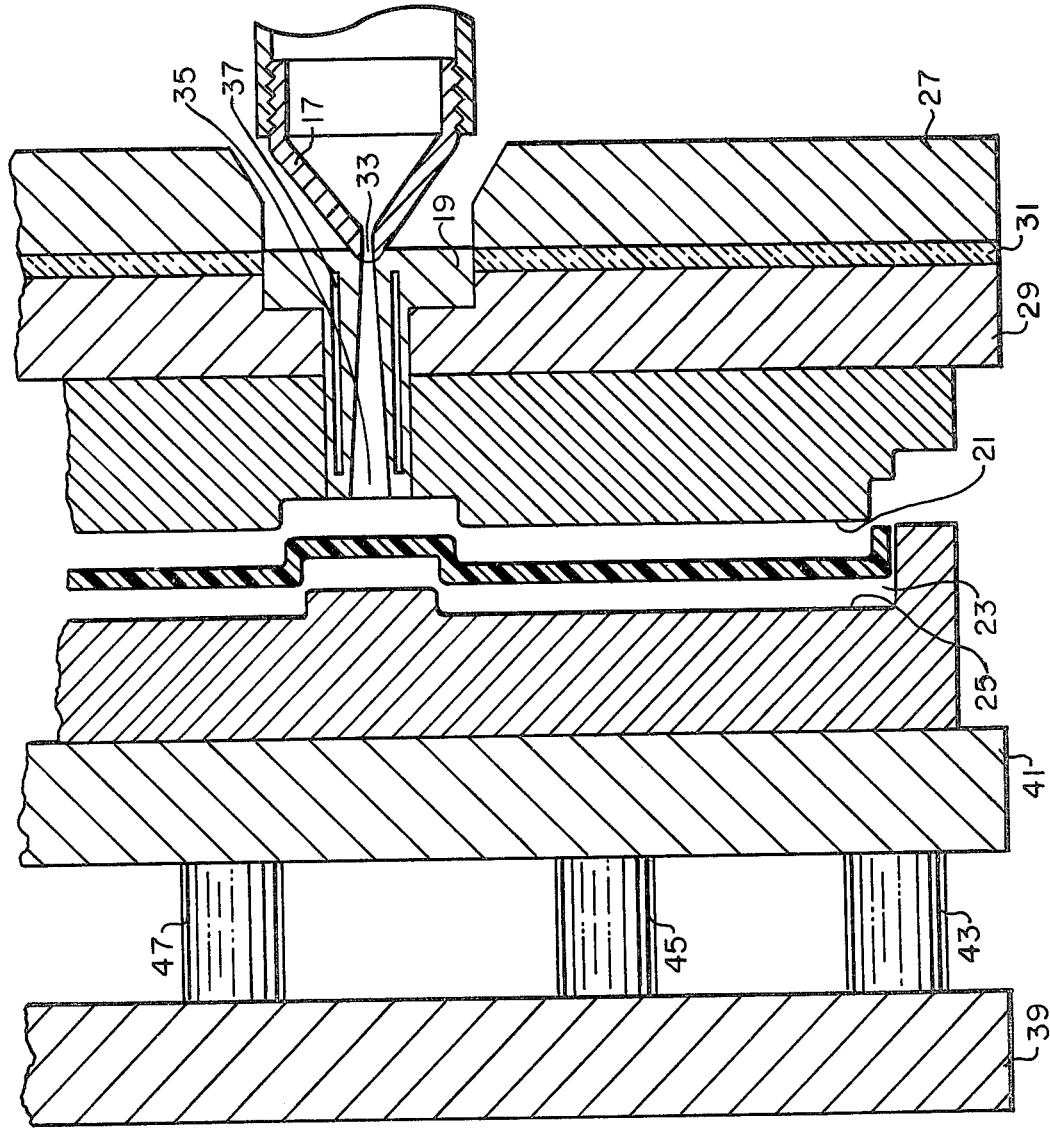

FIG. 3 shows the apparatus of FIG. 1 in an open position. In this position, the movable platen assembly has been actuated to move in a direction away from the stationary platen assembly, allowing the removal of the molded article from the open mold face and surrounding area in preparation for repositioning the components in the feed stage as shown in FIG. 1.

Looking now at FIG. 1, thermosetting molding material is fed into feed hopper 11 and then into a plasticizing zone formed by heated barrel 13 and by the mechanical working of screw 15. A predetermined amount of plasticized molding material is subsequently injected by screw 15, acting as a ram, through nozzle member 17, through cooled sprue bushing 19, into mold cavity 23, formed by partially open mold faces 21 and 25.

The stationary assembly is comprised of stationary platen, or support plate, 27, which has stationary heat plate 29 mounted thereon. Suitably, heat plate 29 is separated from platen 27 by a layer of insulation 31, e.g., insulation board. Heat plate 29 has a mold face 21 mounted thereon. Heat plate 29 may suitably be heated by the circulation of steam or hot oil therethrough but, more preferably, electrically. Heat plate 29 supplies heat to mold face 21. The temperature maintained on the mold face is sufficiently high that, when combined with the pressure generated when the mold is completely closed, will cure, or set, the thermosetting material within the mold cavity. Temperatures in a range between about 135° and about 216° C. (275° to 425° F.) are generally useful, and, within that range, temperatures between about 149° and about 199° C. (300° to 390° F.) are particularly useful for a wide variety of thermosetting molding materials.

The stationary assembly has sprue bushing 19 therein and extending therethrough. Sprue bushing 19 has a receiving end 33 adapted to engage, by contact, nozzle member 17. Sprue bushing 19 has a discharge end 35 opening directly into, in direct feed relationship to, mold cavity 23 formed by mold faces 21 and 25. Sprue bushing 19 has a cooling means therein to maintain a temperature within the sprue member below the temperature at which any substantial curing of the thermosetting molding material will occur and sufficiently high to maintain the thermosetting material in a plasticized condition. Temperatures below which any substantial curing takes place are temperatures which are sufficiently low that the fluidity of the plasticized thermosetting feed material is not permanently affected. Generally, temperatures in the range between about 77° and about 143° C. (170° to 290° F.) are useful, and temperatures from about 99° to about 116° C. (210° to 240° F.) are preferably maintained.

Suitably, sprue bushing 19 is cooled by the circulation of a liquid, such as water, at the desired temperature through internal cavities, or channels, such as 37.

The movable assembly consists of movable platen, or support plate, 39, which has heat plate 41 mounted thereon and movable therewith. Heat plate 41 has a mold face 25 mounted thereon, positioned to align in register with corresponding mold face 21 of the stationary platen assembly. Support blocks, such as 43, 45 and 47, are suitably utilized between platen 39 and heat plate 41 to provide a means of removing the molded article from the mold, for example, knock-out rods or pins, not shown. The movable assembly is adapted to be moved reciprocally as a unit, by means not shown, but suitably hydraulically and/or mechanically, in and out of aligned contact with the stationary platen assembly.

Movable heat plate 41 is suitably heated by the circulation of steam or heated oil therethrough but, more practically, electrically, to maintain a temperature on mold face 25 comparable to that maintained on the corresponding mold face 21, that is, a temperature sufficiently high to cure the thermosetting material upon complete closure of the mold faces.

In the injection stage as shown in FIG. 1, mold faces 21 and 25 form partly open mold cavity 23. The plasticized molding material enters mold cavity 23 directly from discharge end 33 of sprue bushing 19 and fills partially open mold cavity 23. The distance the mold faces move from a partially open position to a fully closed position generally ranges between about 0.06 and about 0.50 inches and, more preferably, between about 0.10 and about 0.2 inches.

FIG. 2 shows the apparatus of FIG. 1 in a closed or compression stage of the molding cycle. In this stage, movable platen assembly has moved toward the stationary platen assembly to close aligned mold faces 21 and 25. Upon closure, excess molding material in the mold cavity 23 is forced, or fed, directly back through discharge end 35 of cooled sprue bushing 19 to be used in the next shot, or fill. Only a minor amount, less than 1.0 percent, of the molding material is forced out the sides of the mold faces to be lost as flash. In the closed, or compression, stage the thermosetting molding material previously fed into the space between the partially open mold faces is pressed and heated to cure the enclosed material to the internal shape of the mold.

FIG. 3 shows the apparatus of FIG. 1 in an open position. In this position, the movable platen assembly has been retracted, or moved away from, the stationary assembly. The molded article 49 is removed from the mold, suitably by the aid of knock-out pins, not shown, which are usually positioned in the movable mold faces. In this position, any flash which may be present is removed and, if necessary, the mold face cleaned. The components are then ready for repositioning as shown in FIG. 1. At the point shown in FIG. 3, the thermosetting molding material in the nozzle and sprue bushing is stored in a plasticized, substantially uncured state in preparation for the next shot, or injection, of thermosetting material into the mold cavity.

For purposes of simplicity, the present invention has been described in terms of a horizontal clamping arrangement; however, it will be appreciated and understood that the invention is equally adapted to, and useful in, vertical clamping arrangements.

The foregoing description and embodiments are intended to illustrate the invention without limiting it thereby. It will be appreciated that various modifications can be made in the invention without departing from the spirit and/or scope thereof.

In the above-described drawings, the visible edges and exposed surfaces behind the cutting plane have been omitted in the vicinity of the mold cavities to simplify the drawings and facilitate the understanding of the apparatus of the invention.

What is claimed is:

1. An improved injection-compression molding apparatus comprising:
   a stationary assembly comprised of:
      a stationary platen assembly
      a heat plate mounted thereon, means to heat said plate,
      a mold face mounted on said heat plate, and
      a cooled sprue bushing extending through said stationary assembly having a receiving end adapted to engage the nozzle of an injection molding machine and a discharge end positioned contiguous to said heat plate;
   a movable assembly comprised of:
      a movable platen member
      a heat plate mounted thereon, means for heating said plate,
      a mold face mounted on said heat plate corresponding to and positioned to be aligned with the mold face on said stationary assembly to form a mold cavity;
   means to move said movable assembly to bring said movable mold face into close proximity and aligned with the corresponding face in said stationary assembly to form a partially open mold cavity and bring the discharge end of said sprue bushing in the stationary assembly into direct feed relationship with said partially open mold cavity;
   means for feeding a supply of plasticized thermosetting molding material through said sprue bushing directly into said partially open mold cavity;
   means for placing said partially open mold cavity in a closed stage to cure any thermosetting material enclosed within the mold cavity by pressure and heat while maintaining the discharge end of said sprue bushing in direct feed relationship with the closed mold cavity; and
   means for retracting said movable assembly to separate said mold face and remove a molded article.

2. The apparatus of claim 1 wherein the temperature at the mold face is maintained between about 135° and about 216° C.

3. The apparatus of claim 1 wherein the means for controlling the temperature within said sprue bushing comprises a reservoir within said member adapted to circulate therethrough a liquid of the desired temperature.

4. The apparatus of claim 3 wherein the temperature in the sprue bushing is maintained at a temperature sufficiently low that no substantial curing of the thermosetting molding material may occur and sufficiently high to maintain the molding material in a plasticized condition.

5. The apparatus of claim 4 wherein the temperature in the sprue bushing is maintained at a temperature with the range of between about 77° and about 143° C.

* * * * *